United States Patent [19]
Inagawa et al.

[11] Patent Number: 5,398,238
[45] Date of Patent: Mar. 14, 1995

[54] DATA COMMUNICATION SYSTEM

[75] Inventors: Shinichi Inagawa; Shohei Matsuda; Toshio Yahagi, all of Wako, Japan

[73] Assignee: Honda Giken Kogyo Kabushiki Kaisha, Tokyo, Japan

[21] Appl. No.: 113,923

[22] Filed: Aug. 31, 1993

[30] Foreign Application Priority Data

Sep. 2, 1992 [JP] Japan ................... 4-259069

[51] Int. Cl.⁶ ........................... H04J 3/06; H04L 5/14
[52] U.S. Cl. ........................ 370/29; 370/85.1;
370/85.11; 370/100.1; 371/5.4; 371/47.1;
340/825.2
[58] Field of Search .................. 370/24, 29, 31, 32,
370/42, 47, 85.1, 85.9, 85.11, 100.1, 13, 14;
375/106, 111, 117; 371/5.1, 5.4, 47.1, 48.1, 67.1,
68.1, 68.3, 69.1; 395/200, 325; 340/825.06,
825.14, 825.2

[56] References Cited
U.S. PATENT DOCUMENTS

| | | | |
|---|---|---|---|
| 3,988,716 | 10/1976 | Fletcher et al. | 370/100.1 |
| 4,093,825 | 6/1978 | Gladstone et al. | 370/100.1 |
| 4,301,532 | 11/1981 | Janetzky | 370/85.11 |
| 4,621,360 | 11/1986 | Inoue | 370/85.11 |
| 4,715,031 | 12/1987 | Crawford et al. | 370/85.1 |
| 4,841,520 | 6/1989 | Steely | 370/85.1 |

FOREIGN PATENT DOCUMENTS

2-238-694 6/1991 United Kingdom .
2-254-713 10/1992 United Kingdom .

Primary Examiner—Alpus Hsu
Attorney, Agent, or Firm—Armstrong, Westerman, Hattori, McLeland & Naughton

[57] ABSTRACT

A data communication system transmits a first data signal from a first control unit to a second control unit. The data communication system includes a clock signal line for transmitting a clock signal between the first and second control units. In performing data communication, the first control unit first transmits a first trigger signal via a first trigger signal line to the second control unit for informing the second control unit of the start of transmission of the first data signal. The first control unit then transmits the first data signal via a first data signal line to the second control unit. A second trigger signal line transmits a second trigger signal from the second control unit to the first control unit for informing the first control unit of the start of transmission of the second data signal. The second control unit then transmits the second data signal via a second data signal line to the first control unit in synchronization with the clock signal.

3 Claims, 11 Drawing Sheets

DATA COMMUNICATION SYSTEM

BACKGROUND OF THE INVENTION

1. Field of the Invention

This invention relates to a data communication system for performing transmission and reception of data between a plurality of control systems, e.g. electronic control units (hereinafter referred to as "the ECU's"), central processing units (hereinafter referred to as "the CPU's"), etc.

2. Description of the Related Art

Conventionally, as a data communication system between control systems, such as CPU's and ECU's, there have been used an asynchronous serial communication system and a clock-synchronous serial communication system, for instance.

Figure 1:
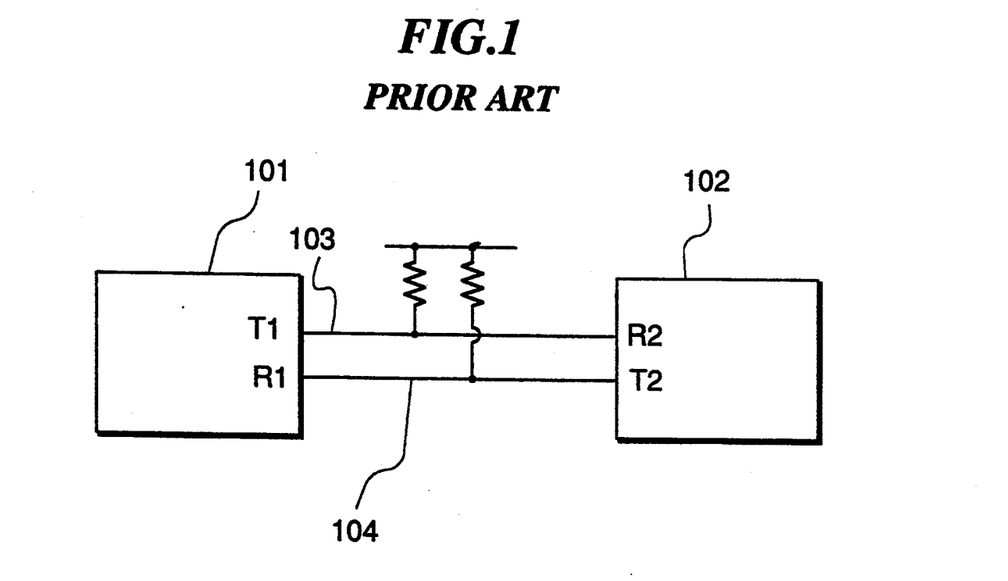
FIG. 1 is a schematic diagram showing the construction of a conventional asynchronous serial communication system.
Figure 2:
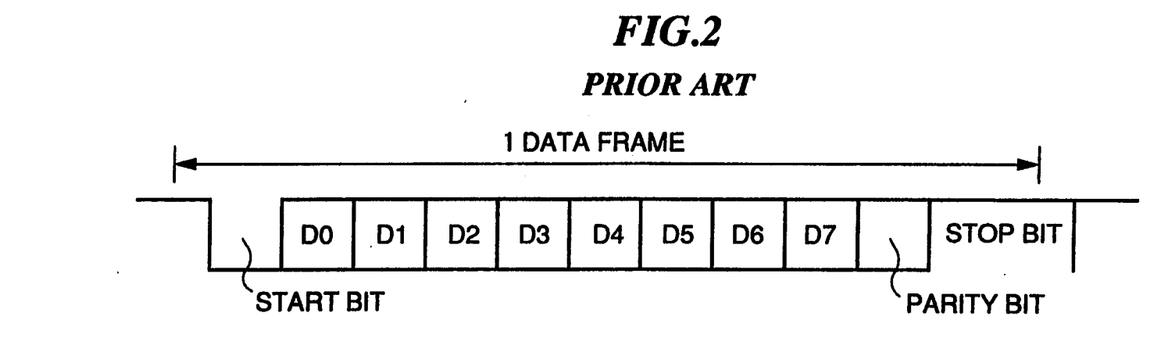
FIG. 2 is a diagram showing a format of data used in the FIG. 1 conventional system for transmitting and receiving data.

In the asynchronous serial communication system, as shown in FIG. 1, there are provided, between two CPU's 101 and 102, a signal line 103 for transmitting data from an output terminal T1 of the CPU 101 to an input terminal R2 of the CPU 102, and a signal line 104 for transmitting data from an output terminal T2 of the CPU 102 to an input terminal R1 of the CPU 101. In this system, data are transmitted in a data format as shown in FIG. 2. That is, one data frame consists of character bits D0 to D7 and a parity bit arranged between a start bit and a stop bit which are used as reference bits for transmission and reception of data.

Figure 3:
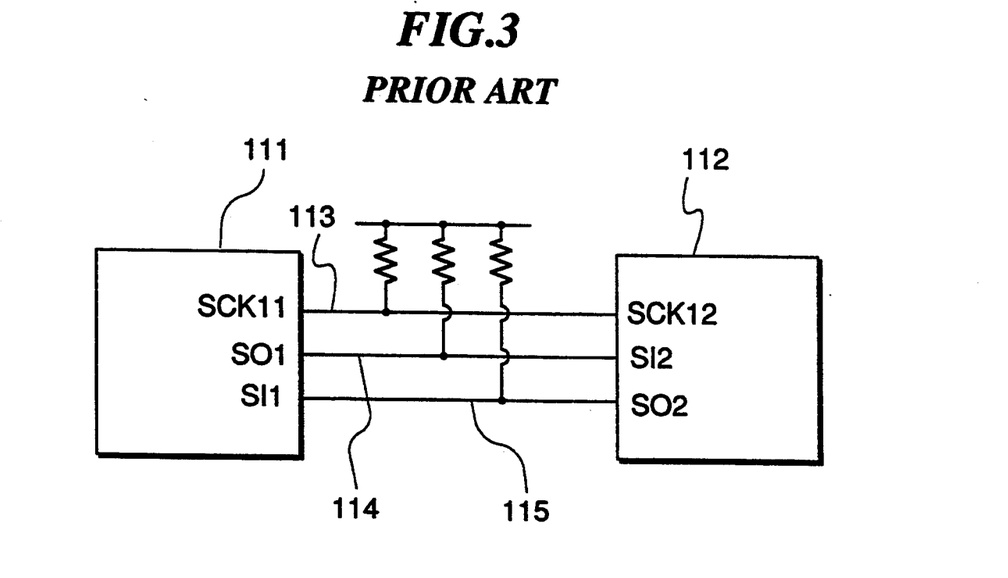
FIG. 3 is a diagram schematically showing the construction of a conventional clock synchronous serial communication system.
Figure 4:
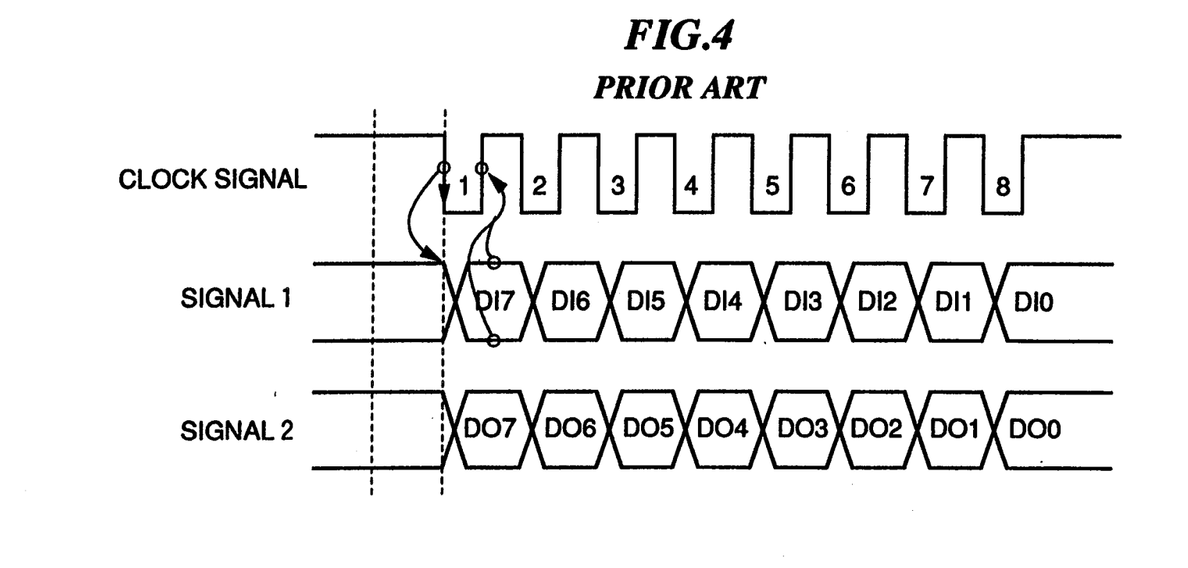
FIG. 4 is a timing chart of signals used in the FIG. 3 conventional system.

On the other hand, in the clock synchronous serial communication system, as shown in FIG. 3, there are provided a clock signal line 113 for transmitting a clock signal between a clock signal terminal SCK11 of a CPU 111, and a clock signal terminal SCK12 of a CPU 112, a data signal line 114 for transmitting data from an output terminal SO1 of the CPU 111 to an input terminal SI2 of the CPU 112, and a data signal line 115 for transmitting data from an output terminal SO2 of the CPU 2 to an input terminal SI1 of the CPU 111. In this system, as shown in FIG. 4, a signal 1 and a signal 2 are transmitted and received via the signal line 114 and the signal line 115, respectively, in synchronism with the clock signal transmitted via the clock signal line 113.

The former of the prior art systems, i.e., the conventional asynchronous serial communication system, has a simplified construction since data are transmitted between the two CPU's 101 and 102 via the two signal lines 103, 104, alone. However, since data and clock signals (i.e. the start bit and the stop bit) are sent and received via the same line, the communication speed is low, and further deformed or false data can occur when reference clock pulses used in the respective CPU's 101 and 102 are deviated from proper timing.

On the other hand, the latter of the prior art systems, i.e., the conventional clock synchronous serial communication system, hardly suffers from the problem of occurrence of deformed or false data due to deviated timing of reference clock signals, since the two CPU's 111 and 112 are operated based on common clock pulses, and at the same time enjoys a high communication speed. However, a noise in the clock signal line 113 can be erroneously recognized as the clock signal, whereupon data transmission is started, even when data communication should not be performed.

SUMMARY OF THE INVENTION

It is the object of the invention to provide a data communication system which is excellent in noise toughness and capable of performing a high-speed data communication.

To attain the above object, the present invention provides a data communication system for transmitting a data signal from a first control unit to a second control unit.

The data communication system according to the present invention comprises:

- a clock signal line for transmitting a clock signal from the first control unit to the second control unit;
- a data signal line for transmitting a data signal from the first control unit to the second control unit in synchronism with the clock signal; and
- a trigger signal line for transmitting a trigger signal from the first control unit to the second control unit for informing the second control unit of start of transmission of the data signal;
- wherein the data signal is transmitted from the first control unit to the second control unit when the trigger signal is transmitted from the first control unit to the second control unit via the trigger signal line.

Preferably, the data communication system further comprises:

- a second data signal line for transmitting a second data signal from the second control unit to the first control unit in synchronism with the cock signal, and a second trigger signal line for transmitting a second trigger signal from the second control unit to the first control unit for informing the first control unit of start of transmission of the second data signal, and the second data signal is transmitted from the second control unit to the first control unit when the second trigger signal is transmitted from the second control unit to the first control unit via the second trigger signal line.

More preferably, the data signal is transmitted from the first control unit to the second control unit twice for collation by the second control unit.

Further preferably, the second data signal is transmitted from the second control unit to the first control unit twice for collation by the first control unit.

The above and other objects, features, and advantages of the invention will become more apparent from the following detailed description taken in conjunction with the accompanying drawings.

DETAILED DESCRIPTION

The invention will be described in detail with reference to the drawings showing an embodiment thereof.

Figure 5:
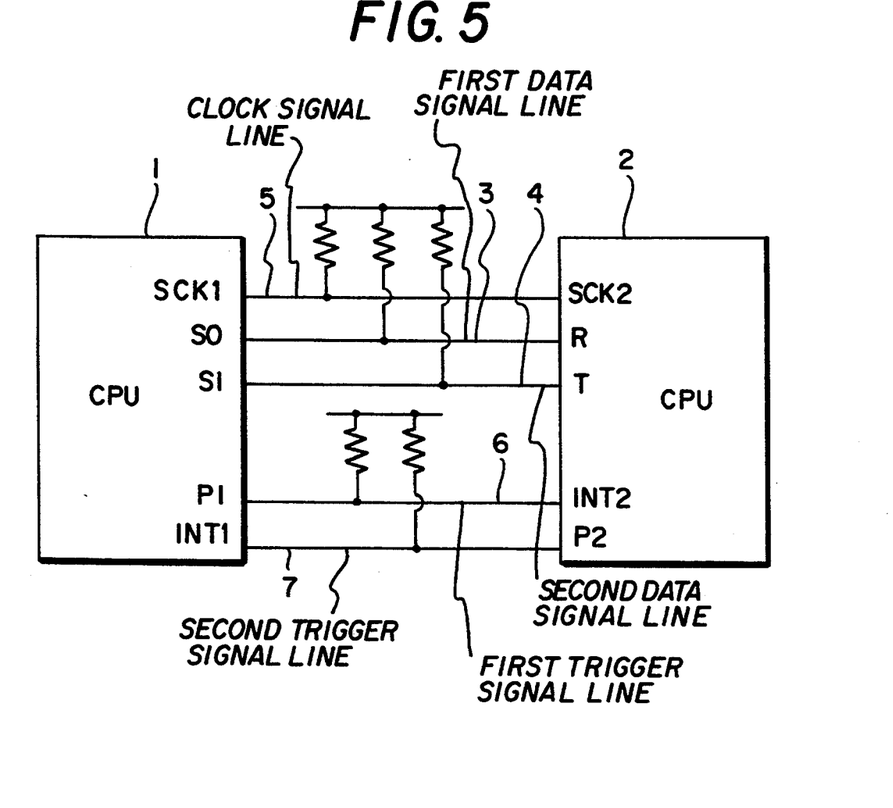
FIG. 5 is a diagram schematically showing the whole construction of a data communication system according to an embodiment of the invention.

FIG. 5 shows the entire construction of a data communication system according to an embodiment of the invention. In the figure, reference numerals 1 and 2 designate CPU's as control units, respectively, both installed on an automotive vehicle, not shown. The CPU 1 is provided within an antilock braking system (ABS) adapted to perform braking control of driving wheels depending on locking conditions thereof, while the CPU 2 is provided within a traction control system (TCS) adapted to perform control of an output torque of an engine installed on the automotive vehicle depending on slip conditions of the wheels. The CPU's 1 and 2 both have the function of serial communication for mutually transmitting and receiving data required by each other, e.g. data of control parameters (e.g. control flags) and engine operating parameters (vehicle speed, braking hydraulic pressure, etc.) via a first data signal line 3 and a second data signal line 4.

The first data signal line 3 is for transmitting data from an output terminal SO of the CPU 1 to an input terminal R of the CPU 2, while the second data signal line 4 is for transmitting data from an output terminal T of the CPU 2 to an input terminal S1 of the CPU 1. Besides the first and second data signal lines 3, 4, there are provided for data communication between the CPU's 1 and 2 a clock signal line 5 transmitting a clock signal between a clock signal terminal SCK 1 of the CPU 1 and a clock signal terminal SCK 2 of the CPU 2, a first trigger signal line 6 for transmitting a trigger signal, referred to hereinafter, from a trigger signal output terminal P1 of the CPU 1 to a trigger signal input terminal INT2 of the CPU 2, at a predetermined repetition period, and a second trigger signal line 7 for transmitting a trigger signal from a trigger signal output terminal P2 of the CPU 2 to a trigger signal input terminal INT1 of the CPU 1, at a predetermined repetition period.

Figure 6:
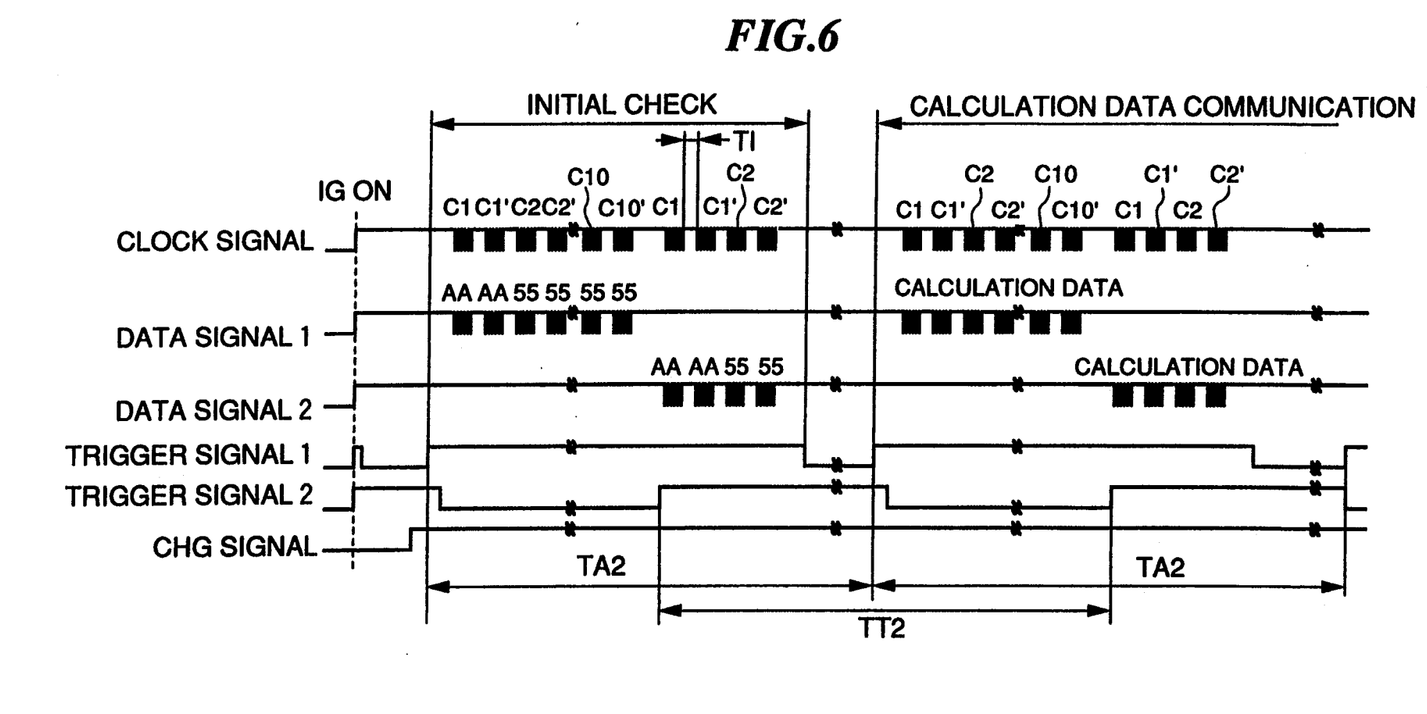
FIG. 6 is a timing chart of signals used in the embodiment.

In the present embodiment, data signal transmission is effected in synchronism with the clock signal, when a trigger signal is transmitted via the first or second trigger signal line 6 or 7. More specifically, as shown in FIG. 6, when a trigger signal 1 is transmitted from the CPU 1 to the CPU 2 via the first trigger signal line 6, a data signal 1 is transmitted via the first data signal line 3 from the CPU 1 to the CPU 2 in synchronism with the clock signal. Conversely, when a trigger signal 2 transmitted from the CPU 2 to the CPU 1 via the second trigger signal line 7, a data signal 2 is transmitted via the second data signal line 4 in synchronism with the clock signal from the CPU 2 to the CPU 1. In FIG. 6, symbol IG represents an ignition switch, not shown of the engine, T1 an idle time (e.g. corresponding to 6 clocks) between adjacent data, TA2 a repetition period of the trigger signal 1 transmitted from the CPU 1 to the CPU 2 via the first trigger signal line 6, and TT2 a repetition period of the trigger signal 2 transmitted from the CPU 2 to the CPU 1 via the second trigger signal line 7.

In addition, immediately after the start of the engine of the automotive vehicle, a charge signal (hereinafter referred to as "the CHG signal") is generated when the charging voltage applied to a battery, not shown, which supplies supply voltage to the system, is stabilized, i.e. the supply voltage is stabilized. Data communication is started only after the CHG signal is generated. This is because during an early stage of the starting operation of the engine, e.g. during cranking by a starter, not shown, the charging voltage is not stable, and hence, if data communication is carried out in such a state, communication errors are liable to occur.

Although in the embodiment the data signal 1 and the data signal 2 are transmitted at different timings in FIG. 6, the two signals may be transmitted at the same timing.

In the present embodiment, a failure check of the communication lines is carried out in the following manner:

1) Initial check

When initializing the data communication system (i.e. when starting data communication), a predetermined set of data for initial check (e.g. AAH, 55H) are transmitted and received by the CPU's a predetermined number of times (five times) to make an initial check for failure of the communication lines.

In this initial check, the transmission and reception of the data for initial check must be carried out just the predetermined number of times, i.e. five times in the present embodiment. This is because unless the number of times of transmission and reception of the initial check data is limited to a certain suitable value (five), even if the initial check proves that the data communication system is normally operating, a routine for the initial check cannot be terminated to start a subsequent routine since no data other than the data for the initial check are allowed to be transmitted during the initial check.

According to the initial check, when the transmission and reception of the data for initial check (AAH, 55H) have been carried out five times, if it is found that the data for initial check are properly transmitted and received even once, it is judged that the communication lines are normal.

2) After the initial check, the following three types of communication error detection a) to c) are carried out only if any one of the five initial checkings provides a good result.

a) Collation of doubly-(i.e., twice-)transmitted data.

The same data are transmitted two times for collation of corresponding received data with each other, i.e. for making a check as to whether the data received the first time agrees with the data received the second time. More specifically, in the present embodiment, as shown in FIG. 6, data used for collation are transmitted in the following manner: First data are transmitted two times in synchronism with respective clock signal pulses C1, C1', and then subsequent data are transmitted in synchronism with respective clock signal pulses C2, C2' two times. The following data are each transmitted two times in the same manner. However, this is not limitative, but the whole frame of data may be transmitted by a first transmission, and then the whole frame of the same data may be transmitted by a second transmission.

If any deformed or false data are detected by the above data collation, i.e., if the data received the first time and the data received the second time do not agree with each other, data received on the last occasion is held for use without updating the last data by the data received this time. Further, if the state in which data are held for use continues over a predetermined time period (e.g 0.8 seconds), it is judged that there is failure in the first or second data signal line 3 or 4, and then a predetermined warning operation (lighting of a lamp) is carried out.

Figure 7:
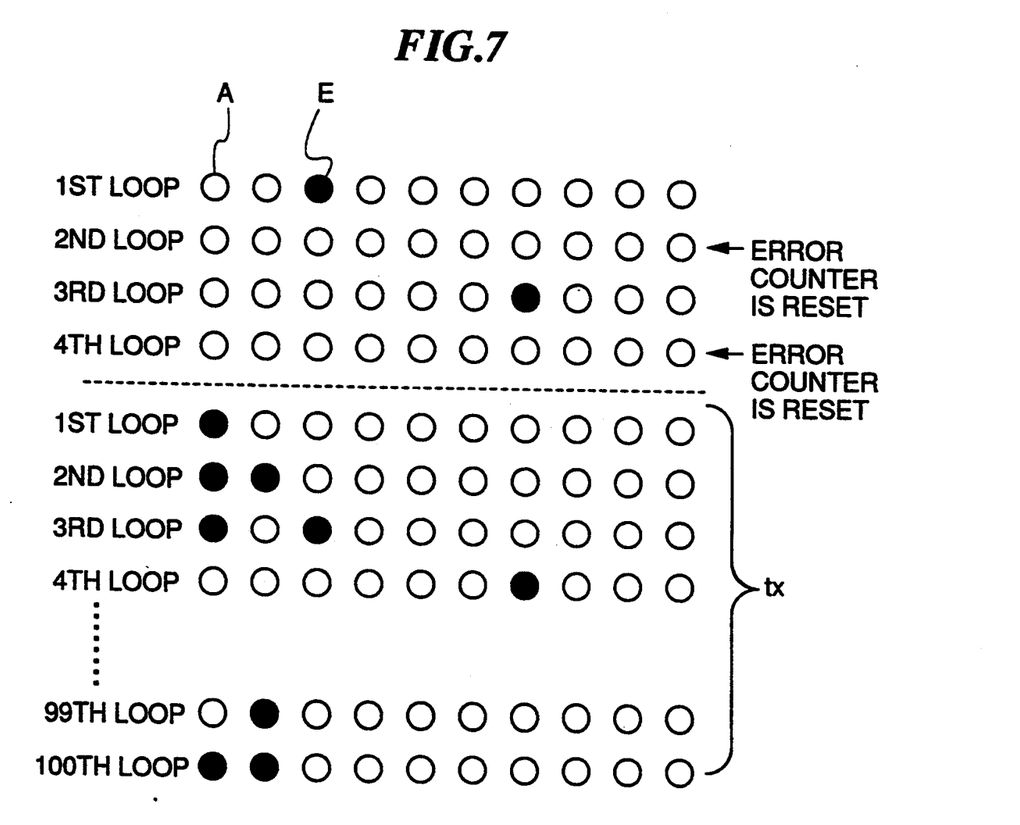
FIG. 7 is a diagram for explaining a manner of a data check carried out in the embodiment.

For example, as shown in a block above the broken line in FIG. 7, if an error E is found in any of the results A of data-checking (i.e. collation), in the first transmission (in the first loop), and also in the third transmission (in the third loop), an error counter, not shown, is started to count an error duration tX over which errors continue to be found. However, if no error is found in the second and fourth loops, as shown in this block of the figure, the error counter is reset each time. On the other hand, if errors continue to be found in all the successive one hundred loops so that the error duration tX exceeds a predetermined time period, it is judged that there is abnormality in the communication lines.

b) Measurement of intervals at which trigger signals are generated.

Each of the CPU's 1 and 2 performs a trigger signal line fail check. That is, each of them measures intervals (repetition periods) of generation of trigger signals. If the measured interval is longer than a predetermined time period (e.g. 1.0 second), it is determined that there is failure, such as a disconnection and a short circuit, in the first or second trigger signal line 6, 7. In other words, if the trigger signals transmitted via the first and second trigger signal lines 6, 7 are generated periodically at a repetition period shorter than the predetermined time period, it is judged that the trigger signal lines 6, 7 are normal.

c) Check for erroneous holding of received data.

To detect failure in the first and second data signal lines 3, 4, each of the CPU's 1, 2 makes a check for holding of data received. More specifically, when all the data received assume a fixed value (e.g. 00H or FFH), i.e., when holding of data has occurred, data received on the last occasion is held for use without updating the last data by the data received this time. Further, if the state in which data are held for use continues over a predetermined time period (e.g, 1.0 second), it is judged that there is failure in the first or second data signal line 3 or 4, and then a predetermined warning operation (lighting of a lamp) is carried out.

Next, a manner of data communication performed in the present embodiment will be described in detail.

First, the operation of the CPU 1 in data communication will be described in detail with reference to FIG. 8A, FIG. 8B, and FIG. 8C.

Figure 8A:
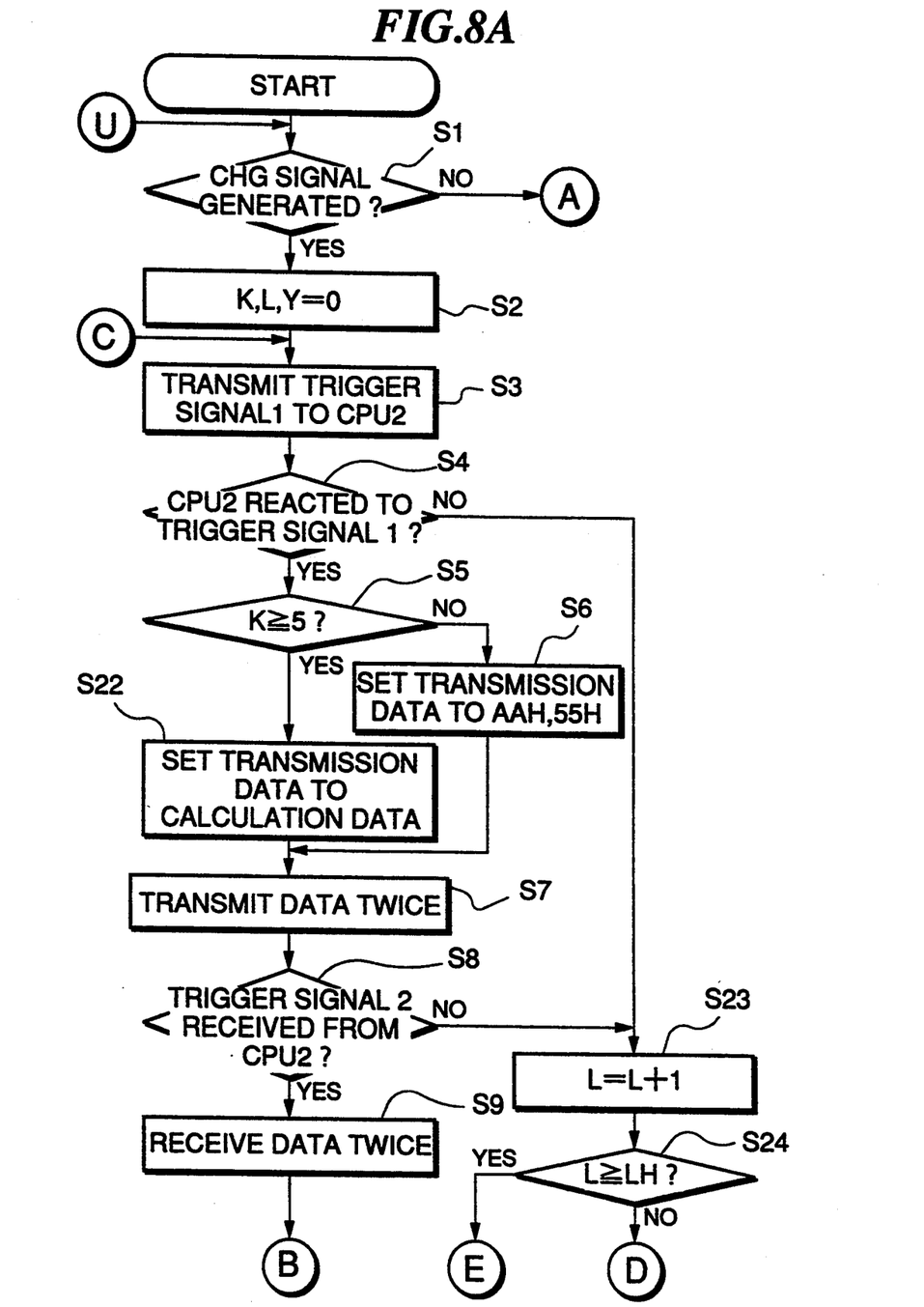
FIG. 8A shows a portion of a flowchart of a data communication program executed by a CPU 1 appearing in FIG. 6.
Figure 8B:
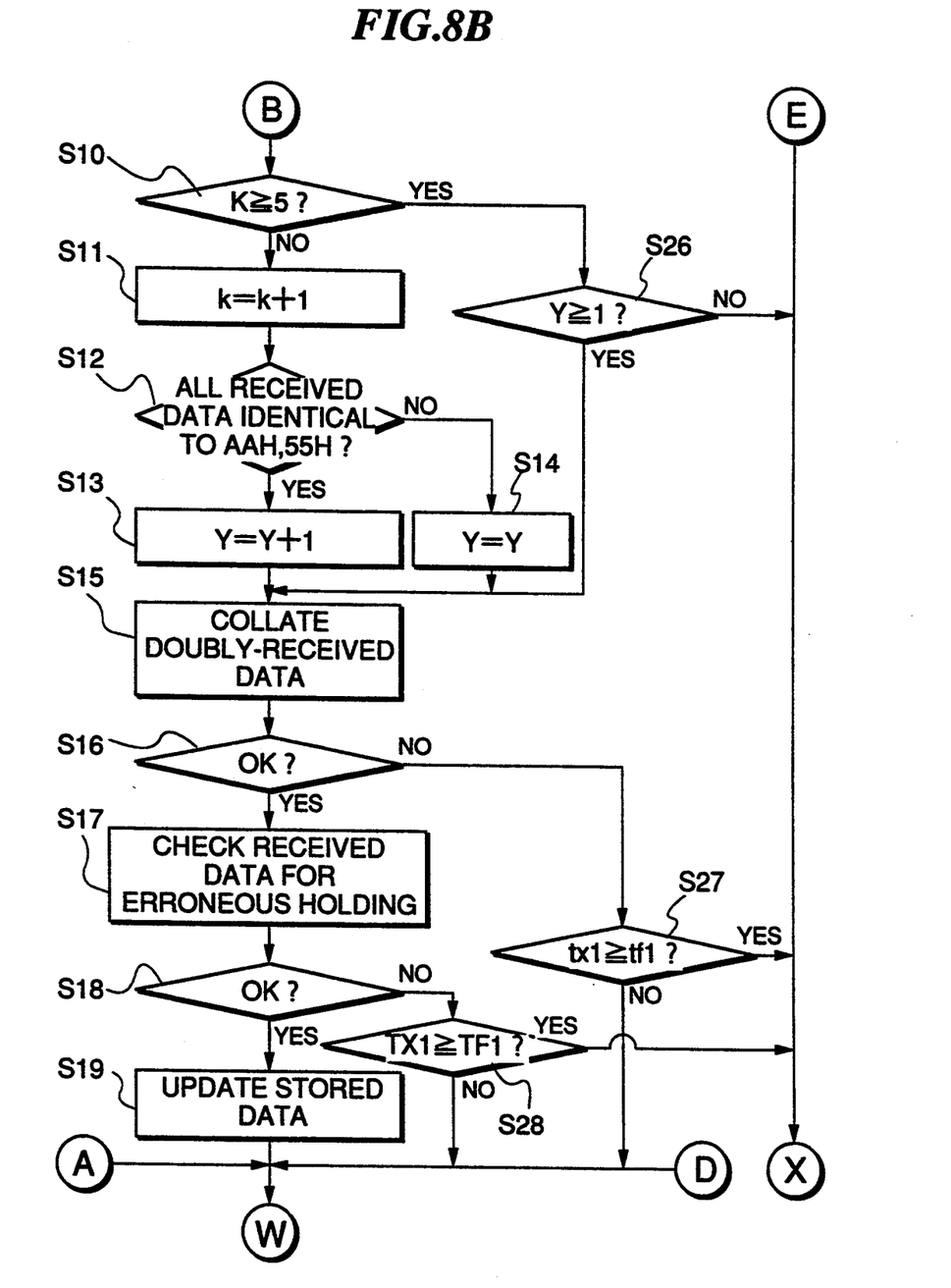
FIG. 8B is a continuation of the FIG. 8A part of the flowchart.
Figure 8C:
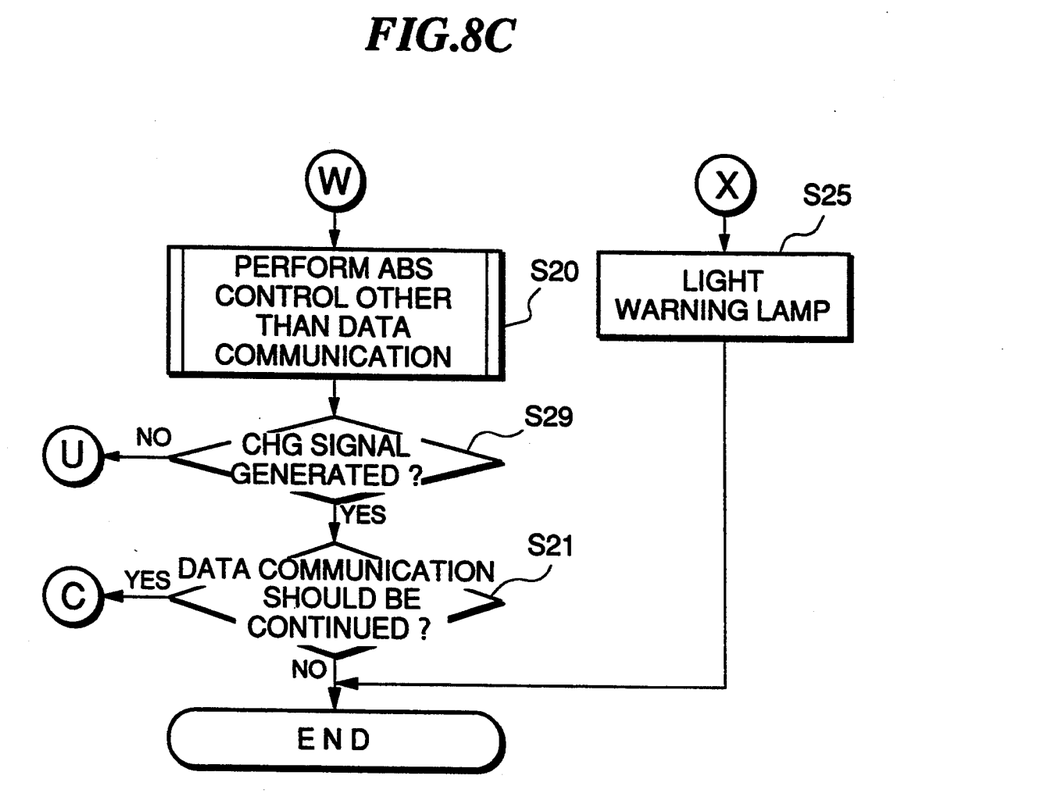
FIG. 8C is a continuation of the FIG. 8B part of the flowchart.

FIG. 8A, FIG. 8B, and FIG. 8C collectively form a flowchart of a data communication routine executed by the CPU 1. This program is executed when the engine on the vehicle is started to operate (i.e. when the ignition switch IG is turned on) or whenever data communication is carried out.

First, at a step S1, it is determined whether or not the CHG signal has been generated. If the answer to this question is negative (NO), i.e., if the CHG signal has not been generated, the data communication system is in the aforementioned state in which the supply voltage to the CPU 1 is not stable, and hence communication errors are liable to occur. Therefore, the program jumps over to a step S20, where the ABS control other than the data communication is executed, followed by the program proceeding to a step S29. At the step S29, it is determined whether or not it has been determined at the step S1 that the CHG signal has been generated, i.e., whether or not the data communication system is in a stable state after generation of the CHG signal. If the answer to the question of the step S1 is negative (NO), the step S29 is also negative (NO), and the program returns to the step S1.

If the answer to the question of the step S1 becomes affirmative (YES), i.e., if the CHG signal has been generated, it is judged that the voltage supplied to the CPU 1 is stable, and then the data communication processing at a step S2 et seq. is carried out. First, at the step S2, count values K, L, Y, referred to hereinafter, are each set to a value of 1, and the trigger signal 1 is transmitted to the CPU 2 via the first trigger signal line 6 at a step S3. Then, at a step S4, it is determined whether or not the CPU 2 has reacted to the trigger signal 1 delivered thereto.

If the answer to the question of the step S4 is negative (NO), i.e., if the CPU 2 has not reacted to the trigger signal, the count value L is increased by an incremental value of 1 at a step S23, and then it is determined at a step S24 whether or not the count value L is equal to or larger than a predetermined value LH. If the answer to this question is negative (NO), i.e., if L<LH, the ABS control other than the data communication is performed at the step S20, followed by the program proceeding to the step S29. In the present loop, the answer to the question of the step S29 is affirmative (YES), and then the program further proceeds to a step S21, where it is determined whether or not the data communication should be continued. If the answer to this question is affirmative (YES), the program returns to the step S3, whereas if the answer is negative (NO), i.e., if the data communication should be terminated, i.e., if the ignition switch IG is turned off, the present program is terminated.

On the other hand, if the answer to the question of the step S24 is affirmative (YES), i.e., if L≧LH, it means that the CPU 2 has not reacted to the trigger signal 1 for a long time period, and hence it is judged that an abnormality has occurred in the communication line(s), followed by the program proceeding to a step S25 without performing the data communication. At the step S25, a warning lamp, not shown, such as a lamp for indication of abnormality of the ABS and the TCS or a lamp for indication of abnormality of the whole breaking system is lighted, followed by terminating the program. In addition, the predetermined value LH is set to a value corresponding to a limit time period (e.g. 1.0 second) for determining abnormality of the communication lines.

If the answer to the question of the step S4 is affirmative (YES), i.e. if the CPU 2 has reacted to the trigger signal, it is determined at a step S5 whether or not the count value K is equal to or higher than a value of 5. In the first execution of the loop passing this step, the count value K is equal to 0, and hence the answer to the question of the step S5 is negative (NO). Accordingly, the program proceeds to a step S6, where data for transmission are set to the aforementioned data for initial check (AAH, 55H).

Then, the data thus set (i.e. the data for initial check) are each transmitted twice via the first data signal line 3 to the CPU 2 at a step S7, and then it is determined at a step S8 whether or not the trigger signal 12 has been transmitted from the CPU 2 to the CPU 1.

If the answer to the question of the step S8 is negative (NO), i.e., if the trigger signal has not been transmitted from the CPU 2, the count value L is increased by an incremental value of 1 at the step S23, and then it is determined at the step S24 whether or not the count value L is equal to or higher than the predetermined value LH. If the answer to this question is negative (NO), i.e., if $L<LH$, the program proceeds to the step S20, whereas if the answer is affirmative (YES), i.e. if $L \geq LH$, the warning lamp is lighted at the step S25, followed by terminating the program. That is, these steps are carried out for judging that there is abnormality in the second trigger line 7 when the repetition period TT2 of the trigger signal transmitted via the second trigger signal line 7 is equal to or longer than a predetermined time period (e.g. 1.0 second), and accordingly for executing a failsafe operation when abnormality is determined to occur.

If the above step S8 is affirmative (YES), i.e., if the trigger signal has been transmitted from the CPU 2 via the second trigger signal line 7, data each transmitted twice from the CPU 2 via the second data signal line 4 are received at a step S9.

Then, it is determined at a step S10 whether or not the count value K is equal to or larger than 5. If the answer to this question is negative (NO), i.e., if $K<5$, the count value K is increased by an incremental value of 1 at a step S11, followed by the program proceeding to a step S12.

In the following loops S11 to S13, according to the present embodiment, the transmission of data (AAH and 55H) for the initial check is consecutively carried out five times (in five loops) when the data communication is started. Therefore, if $K<5$, data to be transmitted and data to be collated with received data are both set to those for the initial check. These steps form an initial check routine. In this connection, according to the present embodiment, during the initial check as well, the same data are each transmitted and received twice for collation. Therefore, the data (AAH, 55H) for the initial check are each transmitted and received twice in one loop of the present routine, and the double data transmission and reception are repeated five times (i.e. in five loops).

At the step S12, it is determined whether or not the received data are all identical to AAH, 55H. If the answer to this question is affirmative (YES), i.e. if all the received data are the data for the initial check, and hence it can be judged that data communication has been normally performed, the count value Y for determining abnormality is increased by an incremental value of 1 at a step S13, and then the program proceeds to a step S15. On the other hand, if the answer to the question of the step S12 is negative (NO), i.e., if the received data contain data other than the data (AAH, 55H) for initial check, and hence it can be judged that a communication error has occurred, the program proceeds to a step S14, where the count value Y is held to an initial value (0) if the preset loop is the first loop to carry out this determination, whereas the count value Y is held to the preceding value if the present loop is the second or any other subsequent loop to carry out the same, followed by the program proceeding to the step S15.

If the answer to the question of the step S5 is affirmative (YES), i.e., if $K \geq 5$, which means that the data for initial check have already been transmitted and received five times, the data for transmission are set at a step S22 to calculated values (calculation data) obtained by the CPU 1, and the calculation data are each transmitted twice to the CPU 2 at the step S7. If it is determined at the step S8 that the CPU 1 has not received the trigger signal 2 transmitted from the CPU 2, the program proceeds to the step 23, whereas if the CPU 1 has received the trigger signal 2, data transmitted from the CPU 2 are received at the step S9, followed by the program proceeding to the step S10. Since in the present case, $K \geq 5$, the answer to the question of the step S10 is affirmative (YES), and accordingly, the program proceeds to the step S26, where it is determined whether or not the count value Y for determination of abnormality is equal to or larger than 1.

If the answer to the question of the step S26 is negative (NO), i.e., if $Y=0$, it means that communication error has occurred in all the five loops for checking for reception of the data for the initial check, and hence it is judged that there is abnormality (failure) in the communication line(s), so that the warning lamp is lighted at the step S25, followed by terminating the program.

On the other hand, if the answer to the question of the step S26 is affirmative (YES), i.e., if $Y \geq 1$, it means that the data for initial check have been properly received at least once in the five loops for checking for reception of the data for initial check, and in this case it is judged that the communication lines are normal, followed by the program proceeding to the step S15.

At the step S15, the data twice or doubly received are collated with each other, and it is determined at a step S16 whether or not the collated data agree with or identical to each other. If the answer to this question is negative (NO), i.e., if the collated data do not agree with each other, the data received in the last loop is held for use without updating it by the data received in the present loop. Then, it is determined at a step S27 whether or not an error duration tx1 over which errors have continued to be detected by the CPU 1 is equal to or longer than a predetermined time period tf1 (e.g. 0.8 seconds). If the answer to this question is negative (NO), i.e., if $tx1<tf1$, the program proceeds to the step S20, whereas if the answer is affirmative (YES), i.e., if $tx1 \geq tf1$, it is judged that there is abnormality in the communication line(s), and hence the program proceeds to the step S25, where the warning lamp is lighted, followed by terminating the program.

If the answer to the question of the step S16 is affirmative (YES), i.e., if the collated data agree with each other, data transmitted via the second data signal line 4 are checked for erroneous holding thereof at a step S17, and it is determined at a step S18 whether or not results of this check prove no erroneous holding of data. In other words, as described hereinabove, if all received data assume fixed values (e.g. 00H, FFH), it is judged that erroneous holding of data has occurred, and otherwise, it is judged that no erroneous holding of data has occurred.

If the answer to the question of the step S18 is negative (NO), i.e., if erroneous holding of the data has occurred, the data received in the last loop is held for use without updating it by the data received in the present loop. Then, it is determined at a step S28 whether or not an erroneous holding duration TX1, counted by a counter, not shown, over which erroneous holding of received data has continued to be detected by the CPU 1, is equal to or longer than a predetermined time period (e.g 1.0 second). If the answer to this question is negative (NO), i.e., if TX1<TF1, the program proceeds to the step S20, whereas if the answer to this question is affirmative (YES), i.e., if TX1≧TF1, it is judged that there is abnormality in the second data signal line 4, and hence the warning lamp is lighted at the step S25, followed by terminating the program.

If the answer to the question of the step S18 is affirmative (YES), i.e., if no erroneous holding of data has occurred, the data received and stored in memory means, not shown, are updated at a step S19 by the data received in the present loop, and the ABS control other the data communication is carried out at the step S20, followed by the program proceeding to the step S29.

In the present case, the answer to the question of the step S29 is affirmative (YES), so that the program proceeds to the following step S21, and if the answer to the question of the step S21 is affirmative (YES), i.e., if the data communication should be continued, the program returns to the step S3, whereas if the answer is negative (NO), i.e., if the data communication should be terminated, the program is terminated.

Figure 9A:
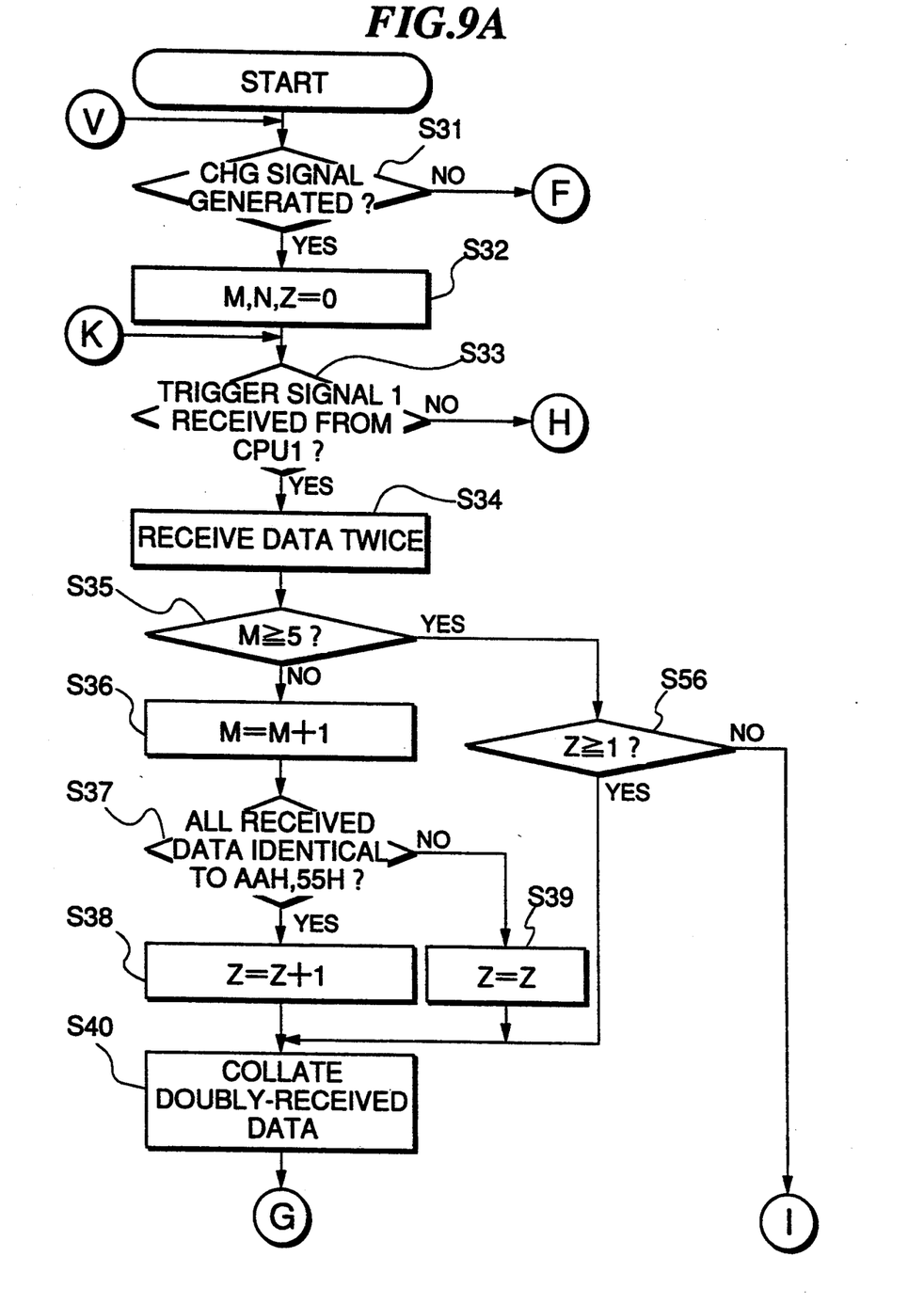
FIG. 9A is part of a flowchart of a data communication program executed by a CPU 2 appearing in FIG. 6.
Figure 9B:
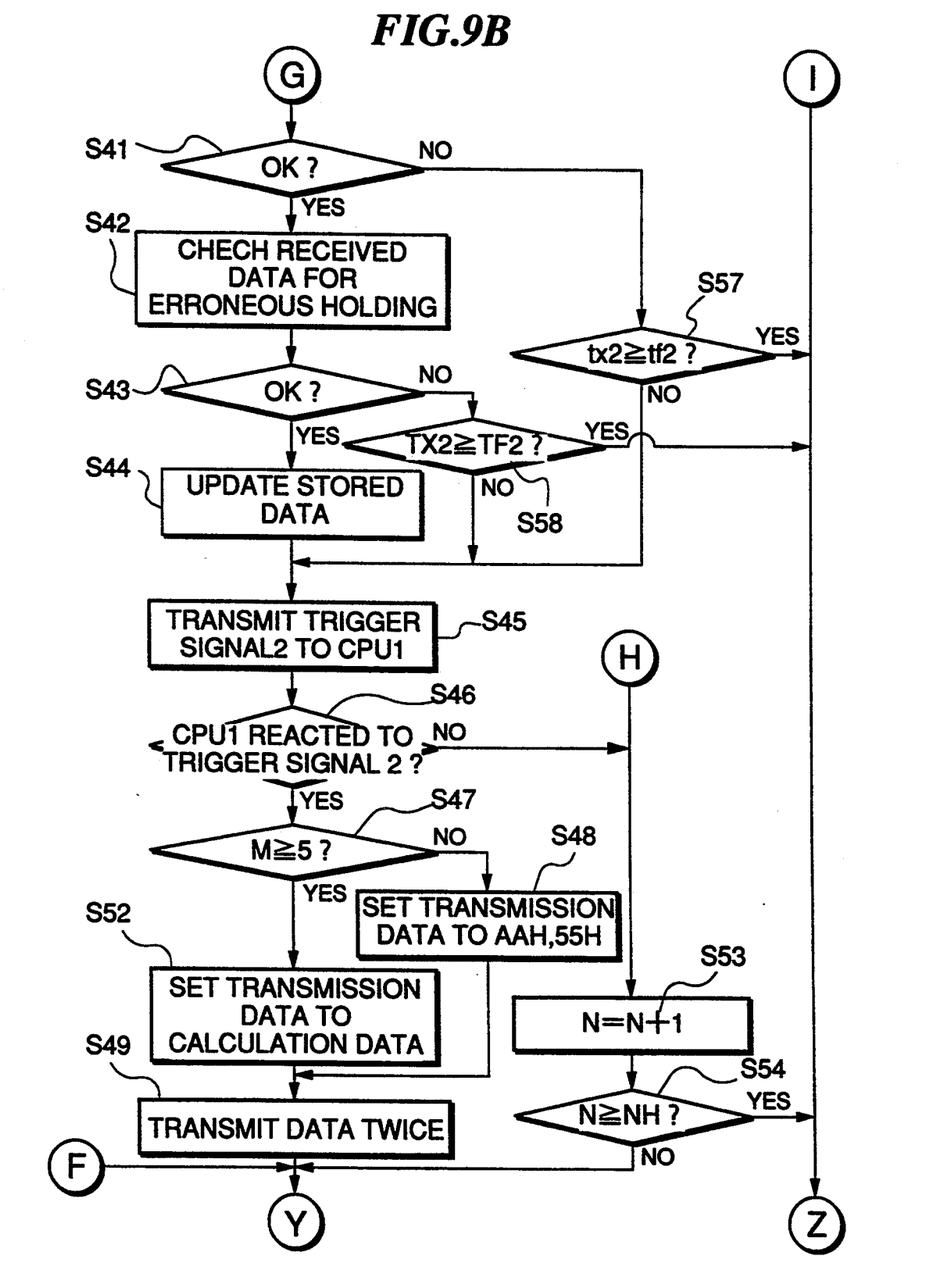
FIG. 9B is a continuation of the FIG. 9A part of the flowchart.
Figure 9C:
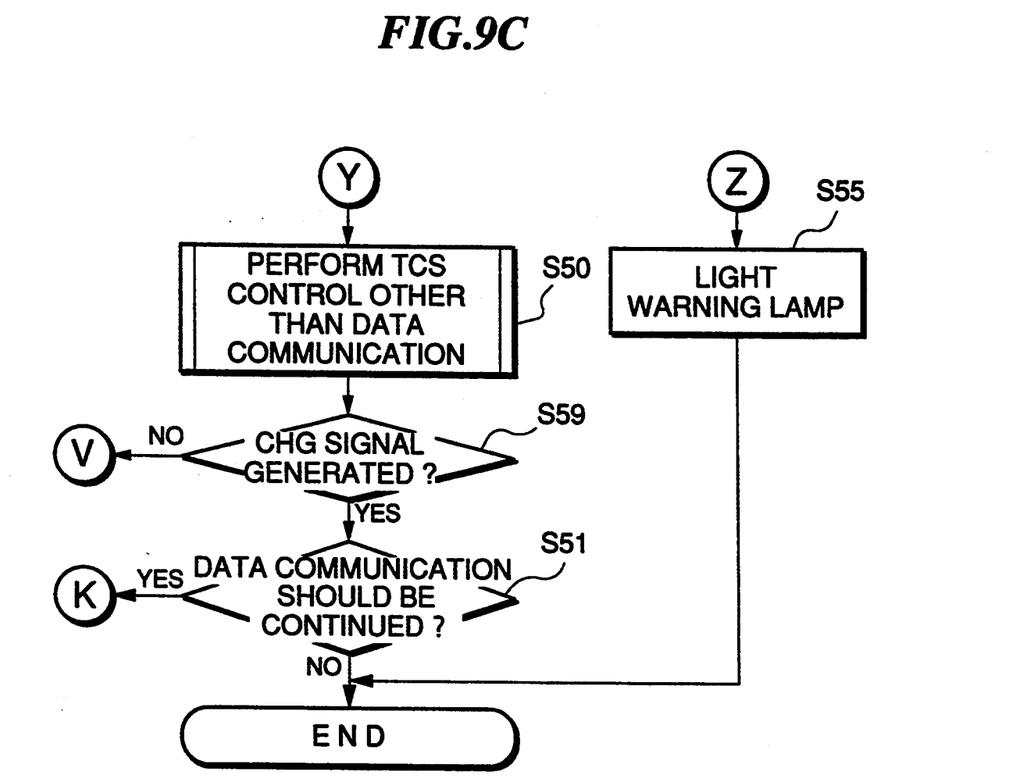
FIG. 9C is a continuation of the FIG. 9B part of the flowchart.

The operation of the CPU 2 during data communication will be described with reference to FIG. 9A, FIG. 9B, and FIG. 9C collectively showing a data communication program executed by the CPU 2. In a manner similar to the program shown in FIG. 8A to FIG. 8C, this program is executed when the engine on the vehicle is started (i.e. when the ignition switch is turned on), or whenever the data communication is started.

First, at a step S31, it is determined whether or not the CHG signal has been generated. If the answer to this question is negative (NO), i.e., the CHG signal has not been generated, the data communication is not started for the same reason as described with reference to the program shown in FIG. 8A to FIG. 8C for the CPU 1, and the TCS control other than the data communication is performed at a step S50, followed by the program proceeding to a step S59. At the step S59, similarly to the step S29 of the program for the CPU 1, it is determined whether or not it is determined at the step S31 that the CHG signal has been generated. If the answer to the question of the step S31 is negative (NO), the answer to the question of the step S59 is also negative (NO), and the program returns to the step S31.

If the answer to the question of the step S31 becomes affirmative (YES), i.e., if the CHG signal has been generated, which means that the voltage supplied to the CPU 1 has become stabilized, and then the data communication processing at a step S32 et seq. is carried out. First, at the step S32, count values M, N, and Z, referred to hereinafter, are each set to a value of 0, and it is determined at a step S33 whether or not the trigger signal 1 has been transmitted from the CPU 1 via the first trigger signal line 6.

If the answer to the question of the step S33 is negative (NO), i.e., if the trigger signal 1 has not been transmitted from the CPU 1, the count value N is increased by an incremental value of 1 at a step S53, and then it is determined at a step S54 whether or not the count value N is equal to or larger than a predetermined value NH. If the answer to this question is negative (NO), i.e., if N<NH, the program proceeds to the step S50, whereas if the answer is affirmative (YES), i.e. if N≧NH, a warning lamp, not shown, such as a lamp for indication of abnormality of the TCS, is lighted, and various failsafe operations are carried out at a step S55, followed by terminating the program. These failsafe operations are carried out, when it is judged that there is abnormality in the first trigger signal line 6. In this connection, the predetermined value NH is set to a value corresponding to a limit time period (e.g. 0.8 seconds) for determining abnormality of the communication lines.

If the answer to the question of the step S33 is affirmative (YES), i.e., if the CPU 1 has transmitted the trigger signal 1 to the CPU 2 via the first trigger signal line 6, the data each transmitted twice from the CPU 1 via the first data signal line 3 are received at a step S34, followed by the program proceeding to a step S35.

At the step S35, it is determined whether or not the count value M is equal to or larger than a value of 5. In the first execution of the loop passing this step, the count value M assumes a value of 0 initially set at the step S32, and hence the answer to the question of the step S35 is negative (NO), which means that the data transmission and reception between the CPU's 1 and 2 have not been carried out five or more times, and the present loop is one for executing the initial check. Accordingly, the program proceeds to a step S36, where the count value M is increased by an incremental value of 1, and it is determined at a step S37 whether or not the received data are all identical to the data for initial check (AAH, 55H).

If the answer to the question of the step S37 is affirmative (YES), i.e., if all the received data are identical to AAH, 55H, and hence it can be judged that the data communication has been normally performed, the program proceeds to a step S38, where the count value Z for determination of abnormality is increased by an incremental value of 1, followed by the program proceeding to the step S40. On the other hand, if the answer to the question of the step S37 is negative, i.e., if the received data contain data other than the data (AAH, 55H) for initial check, and hence it can be judged that a communication error has occurred, the program proceeds to a step S39, where, similarly to the step S14 of the FIG. 8B part of the program for the CPU 1, the count value Z is held to an initial value (0) or the preceding value, followed by the program proceeding to the step S40.

If the answer to the question of the step S35 is affirmative (YES), i.e., if M≧5, which means that the data for initial check have already been transmitted and received five times, similarly to the step S26 of the program for the CPU 1, it is determined at a step S56 whether or not the count value Z for determination of abnormality is equal to or larger than 1. If the answer to this question is affirmative (YES), i.e. if Z=0, it means that communication error has occurred in all the five loops for checking for reception of the data for initial check, and hence it is judged that there is abnormality (failure) in the communication line(s), so that the warning lamp is lighted at the step S55, followed by terminating the program.

On the other hand, if the answer to the question of the step S56 is affirmative (YES), i.e., if Z≧1, which means that the data for initial check have been properly received at least once in the five loops for checking for reception of the data for initial check, it is judged that the communication lines are normal, so that the initial check is terminated and the program proceeds to the step S40 et seq.

At the step S40, the data (the data for the initial check or calculation data) received twice from the CPU 1 are collated with each other, and it is determined at a step S41 whether or not the collated data agree with each other. If the answer to this question is negative (NO), i.e. if the collated data do not agree with each other, the data received in the last loop is held for use without updating it by the data received in the present loop. Then, it is determined at a step S57 whether or not an error duration tx2 over which errors have continued to be detected by the CPU 2 is equal to or longer than a predetermined time period tf2 (e.g. 0.8 seconds). If the answer to this question is negative (NO), i.e., if tx2<tf2, the program proceeds to the step S45, whereas if the answer is affirmative (YES), i.e., if tx2≧tf2, it is judged that there is abnormality in the communication lines, and hence the warning lamp is lighted at the step S55, followed by terminating the program.

If the answer to the question of the step S41 is affirmative (YES), i.e., if the collated data agree with each other, similarly to the steps S17 and S18 of the program for the CPU 1, data transmitted via the first data signal line 3 are checked for erroneous holding thereof at a step S42, and it is determined at a step S43 whether or not this check provides a good result.

If the answer to the question of the step S43 is negative (NO), i.e., if erroneous holding of the data has occurred, the data received in the last loop is held for use without updating it by the data received in the present loop. Then, it is determined at a step S58 whether or not an erroneous holding duration TX2, counted by a counter, not shown, over which erroneous holding of data has continued to be detected by the CPU 2, is equal to or longer than a predetermined time period (e.g 1.0 second). If the answer to this question is negative (NO), i.e., if TX2<TF2, the program proceeds to the step S45, whereas if the answer is affirmative (YES), i.e., if TX2≧TF2, it is judged that there is abnormality in the first data signal line 3, and hence the warning lamp is lighted at the step S55, followed by terminating the program.

If the answer to the question of the step S43 is affirmative (YES), i.e., if no erroneous holding of data has occurred, the data received and stored in memory means, not shown, are updated at a step S44 by the data received in the present loop, and then the trigger signal 2 is transmitted to the CPU 1 via the second trigger signal line 7 at the step S45.

Then, it is determined at a step S46 whether or not the CPU 1 has reacted to the trigger signal. If the answer to this question is negative (NO), i.e., if the CPU 1 has not reacted to the trigger signal 2, the count value N is increased by an incremental value of 1 at a step S53, and then it is determined at a step S54 whether or not the count value N is equal or larger than the predetermined value NH. If the answer to the question of the step S54 is negative (NO), i.e., if N<NH, the program proceeds to the step S50, whereas if the answer is affirmative (YES), i.e., if N≧NH, it is judged that there is abnormality in the communication lines, so that the warning lamp is lighted at the step S55, followed by terminating the program.

If the answer to the question of the step s46 is affirmative (YES), i.e., if the CPU 1 has reacted to the trigger signal 2, it is determined at a step S47 whether or not the count value M is equal to or larger than 5. If the answer to this question is negative (NO), i.e., if M<5, the data for transmission are set to those for the initial check (AAH, 55H) at a step S48, whereas if the answer is affirmative (YES), i.e., if M≧5, the data for transmission are set to calculated values (calculation data) obtained by the CPU 2 at a step S52. Then, the data set are each transmitted twice via the second data signal line 4 to the CPU 1 at a step S49, and then the TCS control other than the data communication is performed at the step S50, followed by the program proceeding to the step S59.

In the present case, the answer to the question of the step S59 is affirmative (YES), and then the program proceeds to the step S51. If the answer to the question of the step S51 is affirmative (YES), i.e., if the data communication should be continued, the program returns to the step S33, whereas if the answer is negative (NO), i.e., if the data communication should be terminated, the program is terminated.

In the data communication system according to the embodiment described above, unless the trigger signal 1 is transmitted from the CPU 1 to the CPU 2 via the first trigger signal 6, no data are transmitted to the CPU 2, while unless the trigger signal 2 is transmitted from the CPU 2 to the CPU 1, no data are transmitted to the CPU 1. Therefore, even if noise occurs in the clock signal line 5, there is no possibility that data start to be transmitted accidentally. This makes it possible to perform high-speed data transmission in synchronism with the clock signal, and at the same time to improve noise toughness of the system.

Further, in the above described embodiment, by executing the initial check, collation of doubly-received data, check of the repetition period of the trigger signals, and erroneous holding of the received data, the following benefits are obtained:
  i) The initial check makes it possible to detect failure of serial communication component parts, not shown, such as serial registers and clock generators, incorporated in the CPU's 1 and 2.
  ii) Collation of data each received twice ensures positive detection of deformed or false data due to external noise.
  iii) The check of the repetition period of the trigger signals makes it possible to detect failure in the first and second trigger signal lines 6 and 7.
  iv) The check for erroneous holding of the received data makes it possible to detect failure of the first and second data signal lines 3 and 4.
  v) Further, in executing the collation of the data each received twice and the check for erroneous holding of the received data, if the error durations tx1 and tx2 are shorter than the respective predetermined time periods tf1 and tf2, or if the erroneous holding durations TX1 and TX2 are shorter than the respective predetermined time periods TF1 and TF2, the preceding data are not updated by the data received in the present loop, but are held for use, which prevents the system from being immediately determined to be abnormal even if deformed or false data have been detected, but, it is possible to continue the data communication until the error durations tx1 and x2 exceed the respective predetermined time periods tf1 and tf2, or until the erroneous holding durations TX1 and TX2 exceed the respective predetermined time periods TF1 and TF2.

Therefore, it is possible to perform a reliable check for abnormality of the communication lines by executing the initial check, the collation of data each received twice, the check of the repetition period of the trigger signals, and the check for the erroneous holding of received data, and further perform reliable failsafe operations for the data communication system, based on results of the reliable check.

The present invention is not limited to the above described embodiment, but various modifications and variations thereto are possible within the scope of the invention defined by the appended claims. For example, in the above embodiment, the invention is applied to a CPU for the ABS and one for the TCS both installed on an automotive vehicle. However, the present invention can also be applied to data communication between other control systems formed by CPU's or ECU's.

Further, although, in the above embodiment, the same data are preferably transmitted doubly or twice, but a complement of the value of data transmitted the first time or an inverted value of same (e.g. if the first data is 4FH = 01001111B, data of BDH = 10110000B) may be transmitted the second time.

What is claimed is:

1. A data communication system for transmitting data signals between a first control unit and a second control unit, comprising:
    a clock signal line for transmitting a clock signal from said first control unit to said second control unit;
    a first data signal line for transmitting a first data signal from said first control unit to said second control unit in synchronism with said clock signal;
    a first trigger signal line for transmitting a first trigger signal from said first control unit to said second control unit for informing said second control unit of start of transmission of said first data signal;
    a second data signal line for transmitting a second data signal from said second control unit to said first control unit in synchronism with said clock signal; and
    a second trigger signal line for transmitting a second trigger signal from said second control unit to said first control unit for informing said first control unit of start of transmission of said second data signal,
    wherein said first data signal is transmitted from said first control unit to said second control unit when said first trigger signal is transmitted from said first control unit to said second control unit via said first trigger signal line, and
    wherein said second data signal is transmitted from said second control unit to said first control unit when said second trigger signal is transmitted from said second control unit to said first control unit via said second trigger signal line.

2. A data communication system according to claim 1, wherein said first data signal is transmitted from said first control unit to said second control unit twice for collation by said second control unit.

3. A data communication system according to claim 1, wherein said second data signal is transmitted from said second control unit to said first control unit twice for collation by said first control unit.

* * * * *